June 16, 1942.  G. F. SCHERER  2,286,689
LUBRICATED VALVE
Filed July 16, 1941
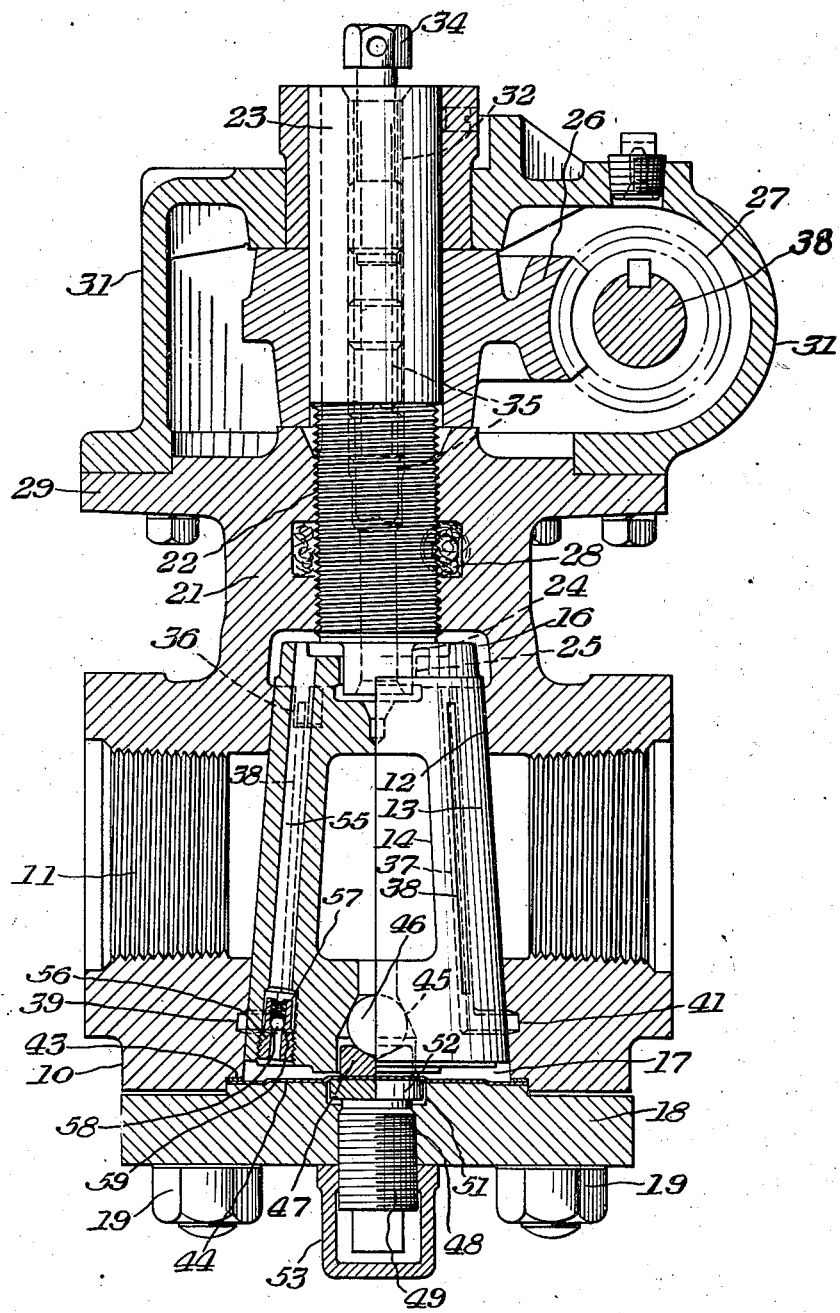
INVENTOR
George F. Scherer.
BY Lewis D. Konigsford
ATTORNEY Patented June 16, 1942

2,286,689

UNITED STATES PATENT OFFICE 2,286,689

LUBRICATED VALVE

George F. Scherer, San Francisco, Calif., assignor to Merco Nordstrom Valve Company, Pittsburgh, Pa., a corporation of Delaware Application July 16, 1941, Serial No. 402,595

8 Claims. (Cl. 251—93)

This invention relates to lubricated plug valves, particularly of the tapered jacking type.

In lubricated plug valves, particularly of that type having a chamber at one end of the plug to receive lubricant under pressure for moving the plug longitudinally, difficulty in turning the valve sometimes is encountered, and this difficulty is not overcome upon lubrication of the valve. This condition is especially liable to occur in tapered valves having a separate operating stem connected to the smaller end of the plug, and in which the plug is totally enclosed by the casing.

According to the present invention, this difficulty is overcome by providing communication between the lubricating system of the valve and the chamber at the larger end of the plug controlled by a one-way valve which does not allow lubricant to pass therethrough into the chamber but which allows any higher pressure from said chamber to act upon the lubricant at the smaller end of the plug. The pressure in the lubricant chamber may fall below line pressure due to a number of causes, such as temperature expansion of the chamber, and in certain types due to escape of lubricant along the stem or longitudinal movement of the stem, and I believe that the difficulty heretofore encountered was due to the relatively high pressure difference acting on the plug to wedge it into its seat when the pressure of the lubricant in the jacking chamber was reduced for any reason. This theory is confirmed by the observation that the more perfect the fit between the plug and seat, the more frequently is this difficulty encountered, as apparently line pressure cannot enter the well sealed jacking chamber.

The invention will be described in detail in connection with the accompanying drawing, wherein I have illustrated a preferred embodiment of the invention by way of example, and wherein the figure represents a vertical cross sectional view of a valve.

Referring to the drawing, the invention comprises a body or casing 10 provided with a passageway 11 for flow of line fluid therethrough. Also formed within the casing and extending transversely of the passageway 11, is a bore 12 which forms a tapered or conical seat. Disposed within seat 12 there is a conical plug 13 provided with a hole or port 14 therethrough adapted to register with passageway 11 in open position of the valve. A lubricant chamber 16 is provided at the small end of the plug, and at the large end of the plug is formed a chamber 17 defined by the end of the plug, the casing walls and the cover plate 18 held in place at its margin by studs and nuts 19.

The casing 10 has an extension 21 at the smaller end of the bore through which a threaded hole 22 extends, and a threaded operating stem 23 extends through said hole into the chamber 16 at the small end of the plug. The operating stem 23 is separate from the plug 13 and has a tongue or extension 24 fitted into a suitable recess 25 in the small end of the plug, the fit being loose enough to provide for a slight play or lost motion. Or, if desired, an adapter of the Oldham coupling type may be used to provide a connection between the stem and plug. The stem 23 has an accurately machined running thread which co-operates with the threads in the wall of hole 22 in the extension 21 of the casing. Because of the accurate machining a very close fit between the threads is provided. A recess 28 is formed in the extension 21 surrounding the hole 22 and is adapted to be packed with a suitable lubricant or fibrous packing material to provide a secondary seal for the stem of the valve. One or more bored extensions (not shown) are provided on the exterior of extension 21, which connect with chamber 28 to supply lubricant or packing thereto.

The plug 13 is adapted to be rotated in its seat to opened or closed position by the segmental worm gear 26, suitably secured to the operating stem 23, and co-operating worm 27 secured on shaft 38; the latter shaft being rotatable by a hand wheel (not shown) secured thereto or by other suitable means. The extension 21 of the casing has a flange 29 thereon to which is secured a casing 31 through a leak-proof connection as shown for housing the gearing mechanism for operating the plug.

For supplying lubricant to the seating surfaces of the plug and casing and for jacking the plug from its seat, the stem 23, which extends externally of the casing 31, has a hole 32 drilled and tapped therethrough in which is located a screw 34 for developing lubricant pressure. Suitable ball check valve fittings 35 in the hole 32 prevent escape of lubricant or line fluid when the screw is removed for refilling. The hole 32 extends the whole way through the stem so as to provide communication through the stem, and through recess 25 with the lubricant chamber 16 at the smaller end of the plug. The seat 12 has two diametrically opposed dwarf or short connecting grooves 36 communicating with the chamber 16 and with two pairs of vertical lubricant grooves 38 in the surface of the plug. The grooves 38 are disposed on the plug so that in the full open or closed positions thereof they communicate with the connecting grooves 36 and with the ends of the circumferential grooves 39 and 41 respectively at the larger end of the plug. The grooves 37 communicates in all positions with the chamber 16 and with the ends of circumferential grooves 39 and 41 at the large end of the plug, and are not exposed to the passageway through the valve in turning the plug between open and closed positions. The ends of grooves 39 and 41 may be spaced substantially 90° apart. For jacking the plug from its seat by lubricant pressure, the screw 34 is advanced into the stem, thereby introducing lubricant into the chamber 16 and grooves 37, 38, 39 and 41 to lift the plug from its seat and lubricate the seating surface.

The cover 18 is inherently resilient and it is formed preferably as a steel forging or a steel casting of suitable thickness. A gasket 43 of aluminum or other suitable material is located on a suitable shoulder surrounding the seat 12 at the large end of the plug, and a diaphragm 44 is located on this washer and is clamped between the gasket and the cover 18. The diaphragm 44 may be single, but preferably is composed of two plates, the internal plate being preferably a non-corrosive alloy such as 18-8 stainless steel, the other or external diaphragm being composed of carbon steel having the proper physical characteristics. The plug has a recess 45 in its large end in which is located a steel ball 46, and a thrust disc 47 having a suitable recess therein is located between the ball 46 and diaphragm 44. Recess 45 may communicate with the plug port 14, or if desired, an additional bore may be provided connecting chamber 17 with the plug port 14. The cover 18 has a threaded bore 48 therein adapted to receive the adjusting screw 49, this bore being counterbored to provide a shoulder 51 at its interior. A steel thrust disc 52 is located in this counterbore and is adapted to be pressed against the diaphragm 44 by the adjustment screw 49. The adjustment screw 49 may be covered by a combined lock nut and cap 53 which preferably is spot welded to the cover to prevent access to screw 49. When it becomes necessary to adjust the screw 49, this cap can be broken loose from the weld by a pipe wrench.

Under certain conditions of operation sometimes encountered in service, the plug may become stuck in its seat so as to be extremely difficult or even impossible to release by the jacking action of lubricant pressure. While ordinarily the pressures acting longitudinally on the plug are substantially equal so that the end thrust of the plug is due only to differential areas, conditions may arise under which the pressures become unequal. Thus, a relatively small loss of lubricant from chamber 16 may cause the pressure therein to momentarily fall or approach atmospheric pressure with the result that the high pressure acting in chamber 17 wedges the plug into its seat. When this occurs, the plug can be packed by lubricant only with great difficulty.

According to my invention, I overcome this difficulty by connecting chamber 17 directly with chamber 16 through a duct 55 having a one-way or check valve 56 therein of suitable construction. Valve 56 preferably comprises a sleeve 57 threaded into bore 55 and having a ball 58 therein seating on a seat 59. Check valve 56 is arranged to allow flow from chamber 17 to chamber 16, but prevents flow of lubricant from chamber 16 to chamber 17.

From the foregoing description it will be apparent that if the pressure in chamber 16 falls for any reason, the check valve 56 allows line fluid pressure from chamber 17 to enter and equalize the pressure therein before any binding or wedging of the plug can occur.

Having described my invention, what I claim and desire to secure by United States Letters Patent is:

1. A valve comprising a casing having a passageway therethrough for flow of fluid and a seat extending transversely of the passageway, a plug located in said seat and having a port adapted to connect with said passageway in open position of the valve, said plug and casing providing chambers at opposite ends of the plug, means for supplying lubricant under pressure to one of said chambers, a duct not connected with the plug surface connecting said chambers, and a valve in said duct permitting flow from said one chamber to the other and preventing flow in the opposite direction.

2. A valve comprising a casing having a passageway therethrough for flow of fluid and a seat extending transversely of the passageway, a plug located in said seat and having a port adapted to connect with said passageway in open position of the valve, said plug and casing providing chambers at opposite ends of the plug, means for supplying lubricant under pressure to one of said chambers, a duct connecting the other of said chambers to the port in the plug, a duct not connected with the plug surface connecting said chambers, and a valve in said duct permitting flow from said last mentioned chamber to the first mentioned chamber and preventing flow in the opposite direction.

3. A valve comprising a casing having a passageway therethrough for flow of fluid and a seat extending transversely of the passageway, a plug located in said seat and having a port adapted to connect with said passageway in open position of the valve, said plug and casing providing chambers at opposite ends of the plug, means for supplying lubricant under pressure to one of said chambers, a lubricant groove system in the seating surface of the plug and seat including grooves exposed to line pressure in certain positions and connected to said one chamber in unexposed positions, a duct not connected with the plug surface connecting the other of said chambers with the lubricant system, and a valve in said duct permitting flow from said other chamber to the lubricant system and preventing flow in the opposite direction.

4. A valve comprising a casing having a passageway therethrough for flow of fluid and a tapered seat extending transversely of the passageway, a tapered plug located in said seat and providing a lubricant chamber with the casing at the smaller end thereof, an operating stem for rotating said plug, a cover for closing one end of the seat, means for resiliently maintaining said plug on its seat, and providing a chamber at the larger end therewith, means for supplying lubricant under pressure to said lubricant chamber, a duct connecting said chambers, and a valve in said duct permitting flow from the second chamber to the lubricant chamber and preventing flow in the opposite direction.

5. A valve comprising a casing having a passageway therethrough for flow of fluid and a seat extending transversely of the passageway, a plug located in said seat, and providing a lubricant chamber with the casing at one end thereof, an operating stem for rotating said plug, a cover for closing one end of the seat and providing a second chamber therewith, means for supplying lubricant under pressure to said lubricant chamber, a duct connecting said chambers, and a valve in said duct permitting flow from the second chamber to the lubricant chamber and preventing flow in the opposite direction.

6. A valve comprising a casing having a passageway therethrough for flow of fluid and a seat extending transversely of the passageway, a plug located in said seat and having a port adapted to connect with said passageway in open position of the valve, an operating stem at one end of the plug, a lubricant chamber formed by the plug and casing adjacent said stem, a chamber formed by the plug and casing opposite the stem end of the plug, means for supplying lubricant under pressure to the chamber at the stem end, a duct not exposed to line fluid connecting said chambers, and a one-way valve in said duct permitting flow into the stem end chamber and preventing flow in the opposite direction.

7. A valve comprising a casing having a passageway therethrough for flow of fluid and a tapered seat extending transversely of the passageway, a tapered plug located in said seat and having a port adapted to connect with said passageway in open position of the valve, an operating stem at the smaller end of the plug separate therefrom, said plug and casing providing a lubricant chamber adjacent the stem end of the plug, means for supplying lubricant under pressure to the lubricant chamber, a second chamber at the opposite end of the plug, a duct not exposed to line fluid connecting said chambers, and a one-way valve in said duct permitting flow into the lubricant chamber and preventing flow in the opposite direction.

8. A valve comprising a casing having a passageway therethrough for flow of fluid and a tapered seat extending transversely of the passageway, a tapered plug located in said seat and having a port adapted to connect with said passageway in open position of the valve, an operating stem at the smaller end of the plug separate therefrom, said plug and casing providing a lubricant chamber adjacent the stem, a chamber formed at the opposite end of the plug, means for supplying lubricant under pressure to the lubricant chamber, a lubricant system for the seating surface of the plug and seat and including said first mentioned lubricant chamber, a duct connecting said lubricant system with the chamber at the larger end, and a valve in said duct permitting flow from said large end chamber to the lubricant system and preventing flow in the opposite direction.

GEORGE F. SCHERER.